United States Patent
Björk et al.

(10) Patent No.: US 7,826,820 B2
(45) Date of Patent: Nov. 2, 2010

(54) NON-HOMOGENOUS TELECOMMUNICATIONS BASE STATIONS

(75) Inventors: Peter Björk, Askim (SE); Helene Hallberg, Södertälje (SE); Jacob Osterling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 835 days.

(21) Appl. No.: 11/677,962

(22) Filed: Feb. 22, 2007

(65) Prior Publication Data

US 2008/0064361 A1  Mar. 13, 2008

Related U.S. Application Data

(60) Provisional application No. 60/824,936, filed on Sep. 8, 2006.

(51) Int. Cl.
 *H04M 11/00* (2006.01)
(52) U.S. Cl. ........................ 455/403; 455/561
(58) Field of Classification Search ................. 455/403, 455/423, 433, 436, 437, 561; 370/26, 336, 370/338, 329, 346
See application file for complete search history.

(56) References Cited

U.S. PATENT DOCUMENTS

| | | | |
|---|---|---|---|
| 5,434,798 | A | 7/1995 | Madebrink et al. |
| 5,852,778 | A | 12/1998 | Labedz |
| 6,845,238 | B1 | 1/2005 | Muller |
| 2002/0004406 | A1 | 1/2002 | Namura et al. |
| 2005/0123301 | A1 | 6/2005 | Kallstenius |
| 2006/0084441 | A1 | 4/2006 | Dowling |
| 2007/0190996 | A1 * | 8/2007 | Asthana et al. ............. 455/420 |

FOREIGN PATENT DOCUMENTS

| | | |
|---|---|---|
| GB | 2 328 581 A | 2/1999 |
| GB | 2 361 385 A | 10/2001 |

OTHER PUBLICATIONS

U.S. Appl. No. 11/538,077 filed Oct. 3, 2006, entitled Automatic Building of Neighbor Lists in Mobile System.
International Search Report and Written Opinion mailed Feb. 26, 2008 in corresponding PCT application PCT/SE2007/050321.

* cited by examiner

*Primary Examiner*—Sam Bhattacharya
(74) *Attorney, Agent, or Firm*—Nixon & Vanderhye, P.C.

(57) ABSTRACT

A network reconfigurator (26) is provided for use in a telecommunications network (20) comprising a network (24) of radio base stations configured for providing radio access service to the telecommunications network for wireless stations (30). The network reconfigurator is arranged or configured, for differing service outages attributable to differing downed radio base stations (28) of the network of radio base stations, to coordinately and dynamically change modifiable characteristics of plural remaining base stations for at least partially compensating for the service outages. Preferably the reconfigurator (26) is configured, for differing service outages, to dynamically change differing modifiable characteristics of differing plural remaining base stations for at least partially compensating for the service outages. Modifying a characteristic of the plural remaining base stations can include modification of one or more of the following: antenna tilt of at least one of the plural remaining base station; power of a downlink common control channel of at least one of the plural remaining base stations; composition of a neighbor list of at least one of the plural remaining base stations; a parameter pertaining to one of handover, cell power, and cell size for the at least one of the plural remaining base stations.

33 Claims, 8 Drawing Sheets

BASE STATION 8 OUT OF SERVICE; BASE STATIONS 1, 4, AND 9 ARE MODIFIED

NON-HOMOGENOUS TELECOMMUNICATIONS BASE STATIONS

This application claims the benefit and priority of U.S. provisional patent application 60/824,936, filed Sep. 8, 2006, entitled "HIGHER AVAILABILITY AND CHEAPER NETWORK BY USING PRIMARY AND SECONDARY SITE CONCEPT", which is incorporated by reference herein in its entirety.

BACKGROUND

I. Technical Field

This invention pertains to telecommunications, and particular to operation of a network comprising base stations which communicate over an air or radio interface with wireless receivers.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast as system information in the cell. The base stations communicate over the air interface with the user equipment units (UE) within range of the base stations. In the radio access network, several base stations are typically connected (e.g., by landlines or microwave) to a controlling node such as, for example, a radio network controller (RNC). The radio network controller, also sometimes termed a base station controller (BSC), supervises and coordinates various activities of the plural base stations connected thereto. The radio network controllers are typically connected to one or more core networks.

A radio access network (RAN) may have or include an Operation SubSystem (OSS), Network Manager, or the like. These entities may be employed to configure and administer the radio access network (RAN).

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

The base stations comprising all or part of a radio access network can be considered as a radio base station network. Conventionally such a radio base station network comprises a rather homogeneous group of radio base stations or nodes. The radio base stations may be homogeneous in the sense of having a common structure and operating methodology. But even if there may be some variance in structure and operation, the radio base stations are (and are expected to be) homogeneous in terms of availability, e.g., same or similar capabilities and potential performance necessary for achieving a same level of availability to users and to the network.

The essentially homogenous nature of contemporary radio base stations imposes a significant and unnecessarily high cost for the radio base station network. For example, in view of their homogenous nature, all radio base stations require battery backup. In some cases, provision of battery backup for a radio base station costs as much as the radio base station itself. As another ramification of homogeneity, all radio base stations are deemed the same in terms of redundancy, hot swapping capability, and the like. Homogeneity also requires that all radio base stations be operated with power-on at all times, even in low-traffic time periods.

Urban wireless telecommunication networks are typically planned for capacity, such capacity being expressed in terms of ERLANG/area or cell-edge services. Most wireless telecommunication networks are initially installed or "rolled out" with a few radio base stations for coverage, and then (e.g., as demand for service grows) the capacity is increased by means of cell-split, e.g., splitting an initial cell served by an initial base station so that the initial base station subsequently handles only a portion of the cell, while the remainder of the initial cell is subsequently handled by a new base station.

As would be expected from the prevailing perspective of homogeneity for radio base stations, the state of the art is to have all radio base stations handled equally.

Moreover, the radio base station network does not take any action inconsistent with homogeneity when a radio base station is taken out of service. In a best case, the operating subsystem (OSS) of the radio access network (RAN) determines which radio base station is removed from service and why.

A radio base station may fall out of service for many reasons - planned or unplanned. A first such example reason or scenario of radio base station is that the radio base station requires or undergoes service (such as a fan replacement, for example, in which service personnel turn off the radio base station).

A second example occurs when the radio base station has an internal failure. If the operator has purchased redundant hardware for the radio base station, the redundant equipment can be substituted and would indeed keep the radio base station in service, albeit with an expensive solution.

A third example occurs when the mains power (e.g. power mains) to the radio base station is cut or lost, i.e. the radio base station experiences a power outage. If the operator has purchased a battery backup, the radio base station can be kept alive at least for some time using battery power. But again, this is an extraordinarily expensive solution.

A fourth example occurs when the operator (network) chooses to turn off a radio base station for a reason such as lack of traffic. An operator may be motivated to turn of a radio base station to decrease the power consumption of the network, e.g. a cost savings measure.

In view of the homogeneity of the radio base station of a radio access network, optimal performance of the radio access network from a user or customer perspective essentially requires that all radio base stations have equal availability, e.g. battery backup, hardware redundancy, and essentially consistent up-times, to maintain service.

What is needed, therefore, and an object of the present invention, are one or more of apparatus, methods, systems, and techniques for dynamically and economically provisioning and tuning a radio base station network

BRIEF SUMMARY

A network reconfigurator is provided for use in a telecommunications network comprising a network of radio base stations configured for providing radio access service to the telecommunications network for wireless stations. The network reconfigurator is arranged or configured, for differing service outages attributable to differing downed radio base stations of the network of radio base stations, to coordinately and dynamically change modifiable characteristics of plural remaining base stations for at least partially compensating for the service outages. Preferably the reconfigurator is arranged or configured, for differing service outages, to dynamically change differing modifiable characteristics of differing plural remaining base stations for at least partially compensating for the service outages.

Modifying a characteristic of the plural remaining base stations can include modification of one or more of the following: antenna tilt of at least one of the plural remaining base station; power of a downlink common control channel (such as a downlink common pilot channel [CPICH]) of at least one of the plural remaining base stations; composition of a neighbor list of at least one of the plural remaining base stations; a parameter pertaining to one of handover, cell power, and cell size for the at least one of the plural remaining base stations.

In an example embodiment, the reconfigurator is arranged or configured to maintain, for each of the downed radio base stations, a list of selected ones of the remaining plural radio base stations to serve as compensatory base stations having the modifiable characteristics. Optionally or additionally, the reconfigurator maintains, for each compensatory base station, an indication of the associated modifiable characteristic(s).

In one of its aspects the technology comprises telecommunications network comprising a reconfigurator arranged or configured to associate a compensatory base station with a vulnerable base station. In conjunction with a loss of provision of the service by the vulnerable base station, the reconfigurator modifies a modifiable characteristic of the compensatory base station whereby the compensatory base station is configured to at least partially compensate for the loss of the provision of the service by the vulnerable base station.

Preferably the reconfigurator is arranged or configured to maintain a list of compensatory base stations having modifiable characteristics which can, in conjunction with a loss of provision of the service by the vulnerable base station, be modified to at least partially compensate for the loss of the provision of the service by the vulnerable base station. Preferably the reconfigurator maintains the list for plural vulnerable base stations.

In one of its aspects the technology comprises telecommunications network comprising a network of radio base stations, with the network of radio base stations comprising one or more primary base stations preconfigured to provide the service with a high level of dependability and to serve as the compensatory base station, and one or more secondary base stations preconfigured to provide the service with a lower level of dependability and to serve as the vulnerable base station. In example implementations, the primary base station is preconfigured to provide the service with the high level of dependability by comprising at least one of power backup and hardware redundancy.

In accordance with another aspect of the technology, the network of radio base stations further comprises a tertiary base station configured to provide the service in a high capacity manner within a specific geographical area. In an example illustrated implementation, the reconfigurator is configured to turn off the tertiary base station during a low traffic condition for the specific geographical area and instead to provide the service for the specific geographical area through another radio base station.

Yet another aspect of the technology concerns a method of operating a telecommunications network. The method comprises providing a network of radio base stations configured for providing radio access service to the telecommunications network for wireless stations. In addition, for differing service outages attributable to differing downed radio base stations of the network of radio base stations, the method comprises coordinately and dynamically changing modifiable characteristics of plural remaining base stations for at least partially compensating for the service outages.

Preferably the method comprises dynamically changing differing modifiable characteristics of differing plural remaining base stations for at least partially compensating for the service outages.

In example implementations, dynamically changing modifiable characteristics of the plural remaining base stations can comprise one or more of the following: (1) modifying antenna tilt of at least one of the plural remaining base stations; (2) modifying power of a downlink common control channel (such as a downlink common pilot channel [CPICH]) of at least one of the plural remaining base stations; (3) modifying composition of a neighbor list of at least one of the plural remaining base stations; and (4) modifying a parameter pertaining to one of handover, cell power, and cell size for the at least one of the plural remaining base stations.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
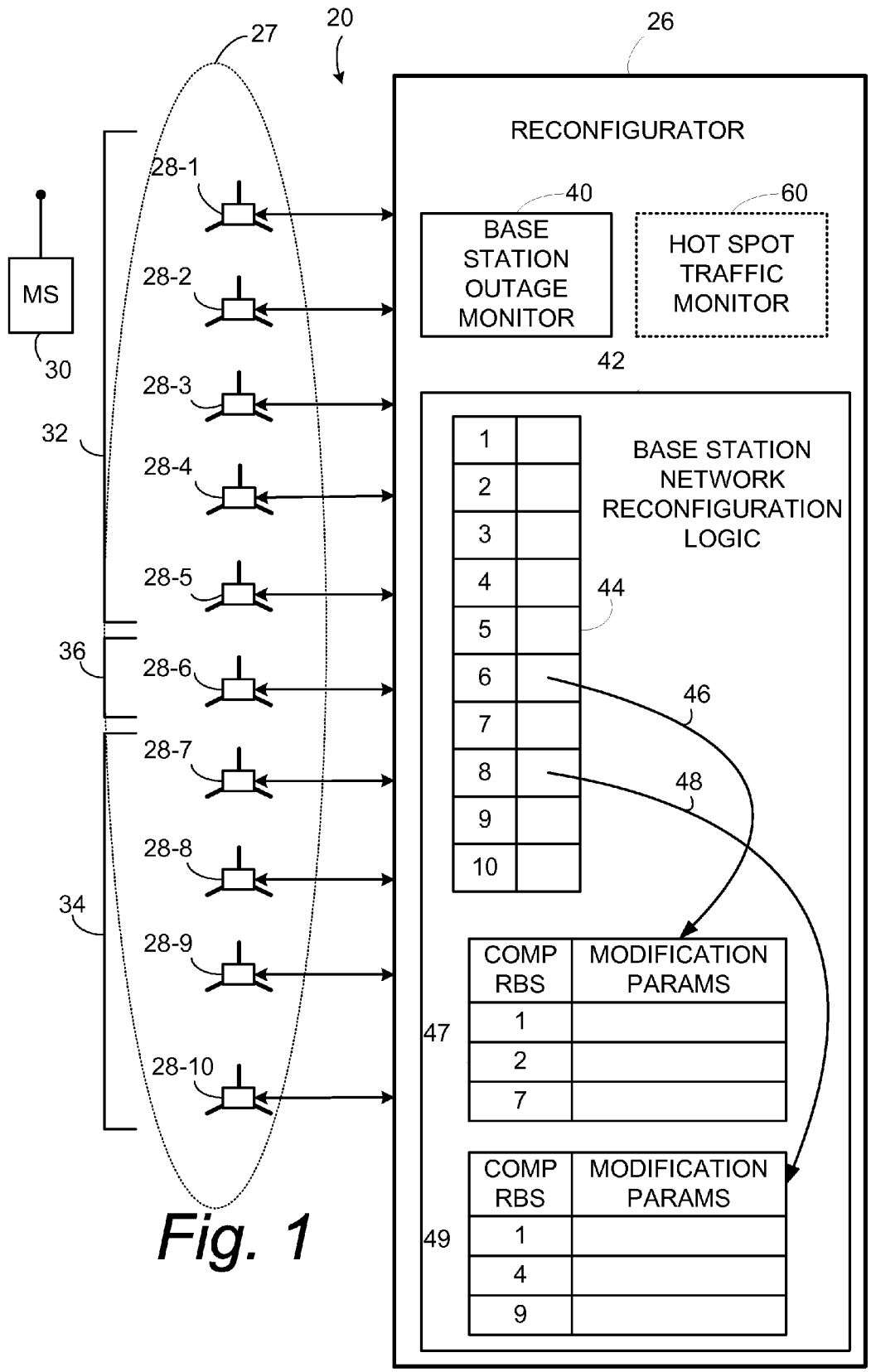
FIG. 1 is a schematic view of structural aspects of an example embodiment of a telecommunications network comprising a network of radio base stations and a reconfigurator.

FIG. 1 shows an example embodiment of a telecommunications network 20 comprising a reconfigurator 26 and a network 27 of radio base stations 28. The network 27 of radio base stations 28 is configured for providing radio access service to the telecommunications network for wireless stations, such as example mobile station 30. In the example radio base station network 27 of FIG. 1, ten radio base stations 28 are illustrated, e.g., radio base station 28-1 through 28-10. The number of radio base stations 28 comprising network 27 is not critical, as a greater or less number of radio base stations may be included. What is of interest is that the radio base stations of network 27 need not be homogenous, e.g., the radio base stations need not all be alike in terms of dependability.

With regard to non-homogeneity of radio base stations, and by way of example, the radio base stations 28 of network 27 are divided into at least two groups. A first group, e.g., base station group 32, comprises one or more primary base stations preconfigured to provide the telecommunications service to mobile stations with a high level of dependability and to serve (in a manner hereinafter explained) as a "compensatory" base station. In the example embodiment of FIG. 1, radio base stations 28-1 through 28-5 are primary radio base stations. In example implementations, the primary base stations of base station group 32 are preconfigured to provide the service with the high level of dependability by comprising at least one of power backup and hardware redundancy.

A second group of radio base stations, e.g., base station group 34, comprises one or more secondary base stations preconfigured to provide the service with a lower level of dependability and to serve as a vulnerable base station. In the example embodiment of FIG. 1, radio base stations 28-7 through 28-10 are secondary radio base stations.

For an optional implementation, FIG. 1 also shows network 27 as comprising a third group, e.g., base station group 36. The base station group 36 comprises one or more radio base stations which serve as high capacity or "hot spot" radio base stations. In the illustrated example of FIG. 1, only one hot spot radio base station is illustrated, e.g., radio base station 28-6. In other implementations, more or no hot spot radio base stations may be provided.

Figure 2:
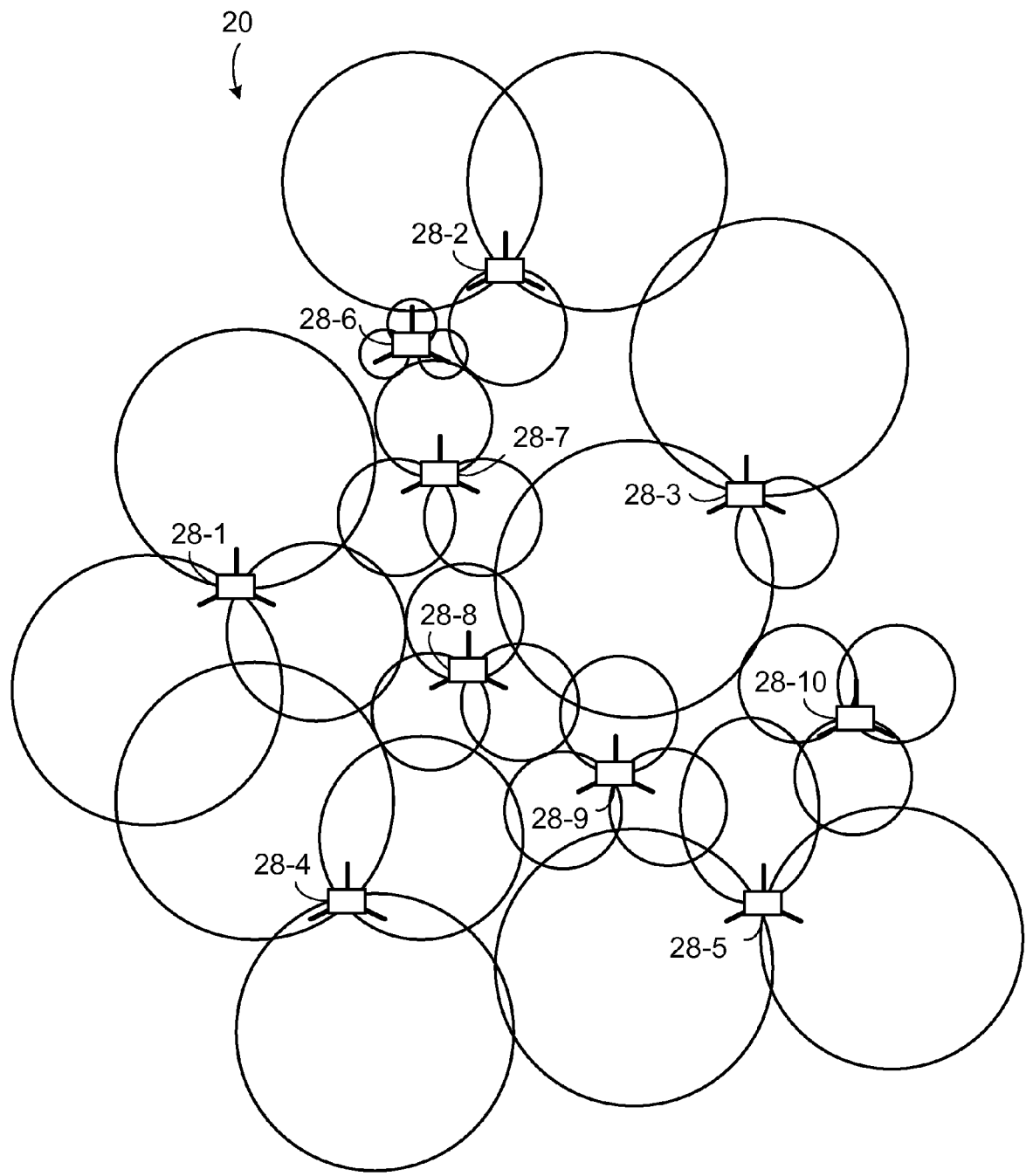
FIG. 2 is a diagrammatic view of the telecommunications network of FIG. 1 in an example illustration of a geographical context of operation.

FIG. 2 shows an example geographical layout for the example telecommunications network of FIG. 1 in an example context of operation. FIG. 2 thus shows an example location or placement for each of the radio base stations 28-1 through 28-10 of FIG. 1. The example illustration of FIG. 2 assumes that each radio base station 28 is a multi-cell radio base station serving three cells. In this regard, three separate circular cells are shown emanating from each radio base station 28. It will be appreciated that more or less cells may exist for each radio base station 28, and indeed that each radio base station 28 may (in one example embodiment) serve only a single cell. Moreover, not all radio base stations need serve the same number of cells, as some radio base station could serve one cell, other radio base stations could serve two cells, other radio base stations could serve three cells, other radio base station could serve four cells, and so fourth. Moreover, each radio base station 28 could additionally or alternatively be structured to have multi-sectors for one or more cells served thereby.

The reconfigurator 26 is arranged or configured, for differing service outages attributable to differing downed radio base stations 28 of the network 27 of radio base stations, to coordinately and dynamically change modifiable characteristics of plural remaining base stations for at least partially compensating for the service outages. Preferably the reconfigurator is arranged or configured, for differing service outages, to dynamically change differing modifiable characteristics of differing plural remaining base stations for at least partially compensating for the service outages.

In the above regard, reconfigurator 26 is illustrated as comprising, at least in a non-limiting, example embodiment, a base station outage monitor 40 and base station network reconfiguration logic 42. The base station outage monitor 40 can take various forms. For example, in one implementation the base station outage monitor 40 merely receives an input, message, or command (e.g., from an operator) which indicates that a particular radio base station is down (e.g., non-operational) or will be taken down. In another implementation, the base station outage monitor 40 includes logic for the base station outage monitor 40 to make its own intelligent determination that a particular radio base station is non-operational, and thus that the particular radio base station is either down or is going down. In either implementation, once an outage for a particular radio base station 28 is diagnosed, discerned, or otherwise known or determined, the base station outage monitor 40 invokes base station network reconfiguration logic 42.

As explained hereinafter with reference, for example, to FIG. 3, upon determination of a radio base station outage the base station network reconfiguration logic 42 performs or executes a network coordinated radio base station outage compensation procedure to provide the aforementioned compensation for service outage. To this end, in the non-limiting, example embodiment of FIG. 1, base station network reconfiguration logic 42 includes a base station association list 44. In the example, non-limiting format illustrated in FIG. 1, the base station association list 44 comprises a record for each radio base station, each record being shown as a row of base station association list 44.

Each record of base station association list 44 comprises a first field (in the first column of base station association list 44) which includes an identifier for the respective radio base station, and a second field (shown as the second column of base station association list 44). In one example implementation, the second field of base station association list 44 can comprise network reconfiguration information necessary for compensating for outage of the associated radio base station. In another example implementation, e.g., the implementation actually depicted in FIG. 1, the second field of base station association list 44 stores a pointer to another record which stores the network reconfiguration information necessary for compensating for outage of the associated radio base station. For example, for radio base station 28-6, pointer 46 of the second field of base station association list 44 points to record 47 associated with radio base station 28-6. The record 47 lists the radio base stations which will serve as compensatory radio base stations in the event of outage of radio base station 28-6. The list of compensatory radio base stations is formatted as the first field (e.g., first column field) of each row of record 47, and shows that radio base station 28-1, radio base station 28-2, and radio base station 28-7 will serve as compensatory radio base stations in the event of outage of radio base station 28-6. The second field or second column of each row of record 47 provides indication as to which characteristics of the compensatory radio base stations (e.g., radio base stations 28-1, 28-2, and 28-7) are to be modified, and how the characteristics are to be modified, to at least partially compensate for outage of radio base station 28-6.

As a second example, for radio base station 28-8, pointer 48 of the second field of base station association list 44 points to record 49 associated with radio base station 28-8. The record 49 lists the radio base stations which will serve as compensatory radio base stations in the event of outage of radio base station 28-8. As seen from record 49, the radio base stations which will serve as compensatory radio base stations in the event of outage of radio base station 28-8 are radio base station 28-1, radio base station 28-4, and radio base station 28-9.

The reconfigurator 26 may be or reside at a node of a radio access network (RAN), such as a radio network controller (RNC) node or a base station controller (BSC) node. Alternatively or additionally, the reconfigurator 26 comprise the operation subsystem (OSS) of the telecommunications network 20, and as such can be in a separate administration and maintenance server or node, either co-located or not at a node of the radio access network. Moreover, the reconfigurator 26 can, in one or more of its example implementations and embodiments, comprise a server, processor, or controller, as those terms/units are expansively explained above.

Thus, for each radio base station, the reconfigurator 26 keeps a list (e.g., base station association list 44) of which other radio base stations to alter, and in what way. When a radio base station becomes unavailable (as communicated to or determined by base station network reconfiguration logic 42), reconfigurator 26 looks at the list 44, and alters the other radio base stations accordingly. Modifying a characteristic of a compensatory base station can include modification of one or more of the following for the compensatory base station (provided by way of non-limiting examples):

The antenna tilt (in case of remote electrical tilt [RET])
The power of a downlink common control channel (such as a downlink common pilot channel [CPICH])
Neighbor lists
Other handover parameter(s), power parameter(s), and cell distance-related parameter(s).

Information regarding which one(s) of these (or other) characteristics are modified for a compensatory radio base station is stored in the second field of a record such as record 47 (for an outage of radio base station 28-6) and in the second field of record 49 (for an outage of radio base station 28-8). For a downed radio base station, the characteristics that are modified need not necessarily be the same for each of the compensatory radio base stations listed in the corresponding record. For example, concerning record 47 for radio base station 28-6, the characteristic that may be modified for radio base station 28-1 may be power of a downlink common control channel (such as a downlink common pilot channel [CPICH]); the characteristic that may be modified for radio base station 28-2 may be composition of its neighbor list; the characteristic that may be modified for radio base station 28-7 may be antenna tilt. Moreover, for any compensatory radio base station, more than one characteristic may be modified or altered in the event of an outage.

Regarding the modifiable characteristics of the radio base stations, a neighbor list is a list of cells which neighbor the cell in which the mobile station is located. The concept of neighbor list is explained in U.S. Pat. No. 6,845,238, entitled "INTER-FREQUENCY MEASUREMENT AND HANDOVER FOR WIRELESS COMMUNICATIONS; and U.S. patent application Ser. No. 11/538,077, entitled "AUTOMATIC BUILDING OF NEIGHBOR LISTS IN MOBILE SYSTEM", and both of which are incorporated herein by reference in their entirety.

Figure 3:
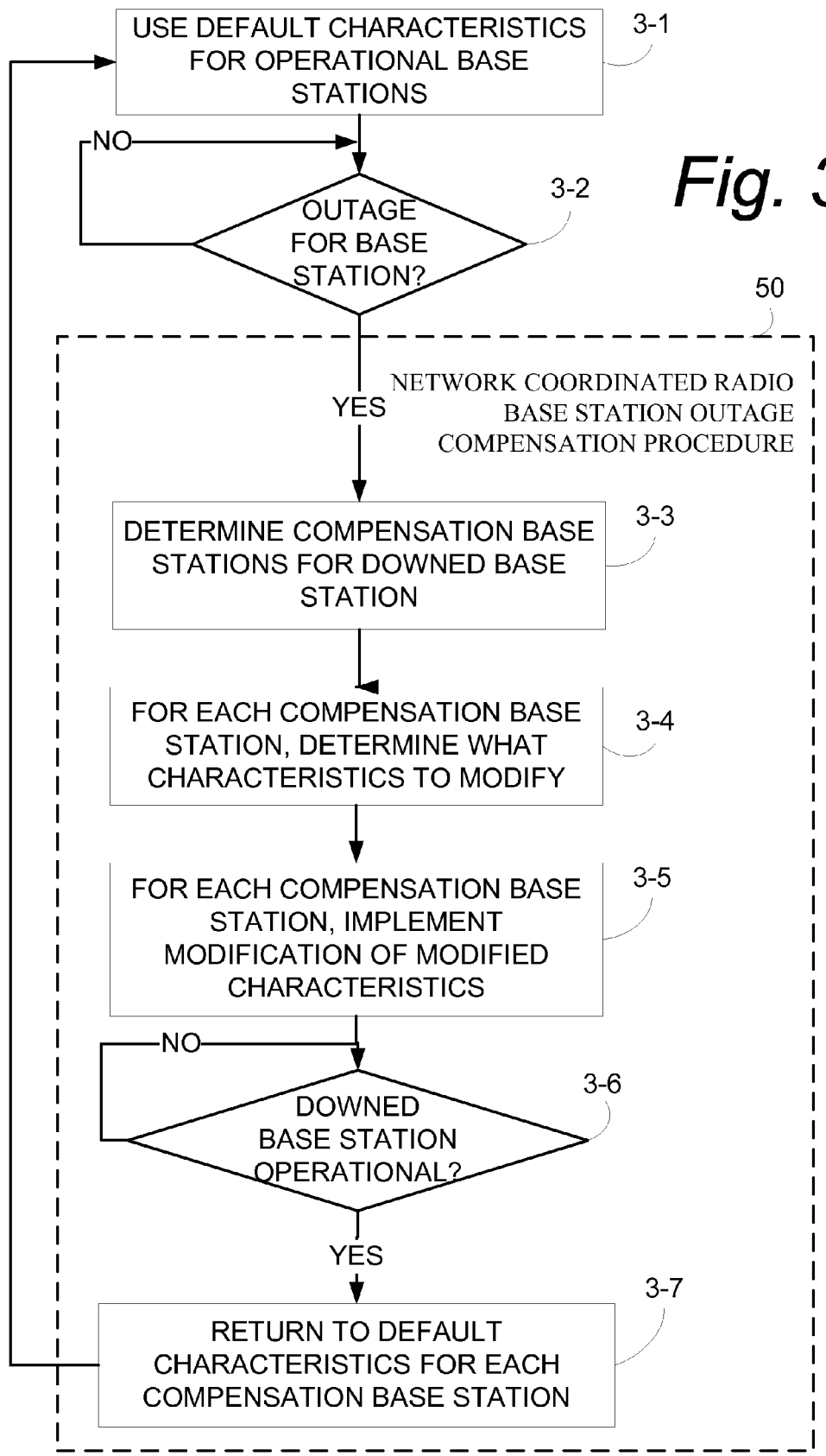
FIG. 3 is a flowchart showing example, representative steps or acts performed in conjunction with a network coordinated radio base station outage compensation procedure.

FIG. 3 shows example, non-limiting, representative steps, events, or acts performed by reconfigurator 26 in conjunction with a network-coordinated radio base station outage compensation procedure 50. Act 3-1 shows reconfigurator 26 using default characteristics (e.g., default characteristic values) for its operational base stations. Act 3-1 thus essentially presumes that network 27 is operational in normal fashion, e.g., that no radio base station has suffered or sustained an outage (either intentional or accidental).

Act 3-2 of FIG. 3 depicts reconfigurator 26, and particularly base station network reconfiguration logic 42 of reconfigurator 26, checking (determining or otherwise being apprised or informed) whether an outage has occurred (or will occur) for a particular radio base station. The check of act 3-2 can be either periodically or continually performed, so that FIG. 3 depicts, if no outage is detected or otherwise known, execution loops back for a further check or execution of act 3-2.

If it is determined at act 3-2 that an outage has occurred (or will occur) for a particular radio base station, the network-coordinated radio base station outage compensation procedure 50 is executed or performed. Example, representative, non-limiting acts or steps of an example mode of the network-coordinated radio base station outage compensation procedure 50 are show in FIG. 3, such as act 3-3 through act 3-7 of FIG. 3.

Upon detection of an outage of a particular "downed" radio base station, as act 3-3 the network-coordinated radio base station outage compensation procedure 50 performed, e.g., by base station network reconfiguration logic 42, determines the compensation base stations for the downed radio base station. Determination of the compensation base stations for the downed radio base station is performed, at least in an example mode, with reference to base station association list 44 such as that shown in FIG. 1. The base station network reconfiguration logic 42 matches the identity of the down radio base station with the first field identifier of base station association list 44, and for the record of the downed radio base station obtains the list of compensatory radio base stations (such as record 47, for example).

Further, upon obtaining the list of compensatory radio base stations for the downed radio base station, as act 3-4 the network-coordinated radio base station outage compensation procedure 50 determines, for each compensatory radio base station, what characteristics of the compensatory radio base station are to be modified to compensate the outage, and how those characteristics are to be modified. In the example of FIG. 1, such information regarding modified characteristics is obtained from a second field of a record such as record 47, for example.

Upon obtaining the modifiable characteristics information, as act 3-5 the network-coordinated radio base station outage compensation procedure 50 implements the compensation for each compensatory radio base stations. As indicated previously, dynamically changing modifiable characteristics of compensatory radio base stations can comprise one or more of the following: (1) modifying antenna tilt of at least one of the plural remaining base stations; (2) modifying power of downlink common control channel (such as a downlink common pilot channel [CPICH]) of at least one of the plural remaining base stations; (3) modifying composition of a neighbor list of at least one of the plural remaining base stations; and (4) modifying a parameter pertaining to one of handover, cell power, and cell size for the at least one of the plural remaining base stations.

As act 3-6 the network-coordinated radio base station outage compensation procedure 50 checks (periodically or continuously), or is apprised or informed (e.g., by base station network reconfiguration logic 42) whether the downed radio base station has resumed operational status (e.g., the outage is over). If the determination of act 3-6 is negative, the compensatory efforts afforded by the compensatory radio base station remain in effect. On the other hand, if it is determined as act 3-6 that the downed radio base station has resumed operational status (e.g., the outage is over), as act 3-7 the compensatory radio base stations are enabled to return to their original (default) characteristics, so that the modifications imposed by act 3-4 and act 3-5 are removed. Processing or execution of network-coordinated radio base station outage compensation procedure 50 then exits or terminates.

In accordance with another optional aspect of the technology, as mentioned above the network 27 can also further comprise a third group 36 of radio base stations, such as the "tertiary" base station or "hot spot" radio base station 28-6 illustrated in FIG. 1. The hot spot radio base station 28-6 is configured to provide the service in a high capacity manner within a specific geographical area. Accordingly, FIG. 2 shows the three cells served by hot spot radio base station 28-6 as being much smaller than most other cells of FIG. 2. The small size of the cells served by hot spot radio base station 28-6 allows service in the specific, (usually) high-traffic geographical area served by the corresponding cells. As explained below, in an example illustrated implementation, reconfigurator 26 is configured to turn off the tertiary base station during a low traffic condition for the specific geographical area and instead to provide the service for the specific geographical area through another radio base station. To this end, reconfigurator 26 optionally includes hot spot traffic monitor 60.

In view of its optional nature, hot spot traffic monitor 60 is shown in broken lines in FIG. 1. In similar manner as base station outage monitor 40, the hot spot traffic monitor 60 can take various forms. For example, in one implementation the hot spot traffic monitor 60 merely receives an input, message, or command (e.g., from an operator) which indicates that a hot spot radio base station (such as radio base station 28-6) is down or will be taken down. In another implementation, the hot spot traffic monitor 60 includes logic for hot spot traffic monitor 60 to make its own intelligent determination that the hot spot radio base station is not serving enough traffic in the hot spot to justify its separate and specialized operation. In either implementation, once termination of service by the particular hot spot radio base station (e.g., 28-6) is diagnosed, discerned, or otherwise known or determined, the hot spot traffic monitor 60 invokes base station network reconfiguration logic 42. In this optional embodiment, the base station network reconfiguration logic 42 includes logic for compensating for the termination of service of the hot spot radio base station, in similar manner as with outage of another radio base station. To this end, base station association list 44 optionally includes a record for the hot spot or tertiary radio base station 28 (e.g., radio base station 28-6 in the illustrated example implementation).

The hot spot traffic monitor 60 can also receive an input regarding the need to take the hot spot radio base station into service again. The input can comprise a command (e.g., from the operator) or information about the traffic load in the cells modified to at least partially compensate for the outage of the hot spot radio base station. When the input is received, e.g., traffic load is higher than a target amount, the hot spot radio base station is taken into service again, and the compensatory radio base stations are changed back to their normal parameters. To this end, reconfigurator 26 may include a memory for storage of the normal or other previous states/values of the parameters.

In conjunction with this optional "hot spot" aspect, it will be appreciated that the network-coordinated radio base station outage compensation procedure 50 of FIG. 3 essentially remains the same, but is implemented whenever it is determined (by hot spot traffic monitor 60 or otherwise) that traffic conditions do not warrant or justify continued operation of a specialized hot spot radio base station.

Thus, the solution can be combined with two features or occur in two further scenarios. The first feature/scenario is the above-described power-saving feature, wherein hot spot sites (e.g., hot spot radio base stations) are taken down during non-busy periods. The adjacent cells are retuned according to the list (e.g., base station association list 44).

A second feature/scenario occurs in conjunction with a non-planned but controlled power-down of one or more radio base stations. For example, in an example scenario of this second feature, for reason either explained or not explained, a radio base station signals that it is going to be powered down in X number of seconds. In response, the network retunes accordingly, e.g., reconfigurator 26 performs its network-coordinated radio base station outage compensation procedure 50 in anticipation of the outage of the signaling radio base station. Any connected mobile stations are either forced over to the other cells or are moved by normal soft handover. If the system relies on soft handover, the margin X seconds preferably should be at least 10 seconds.

This second feature or scenario can be initiated for different reasons, such as two examples now propounded. The first example reason is that a radio base station initiates or undertakes some type of maintenance, e.g. fan replacement. Typically a human engineer initiates the maintenance procedure (e.g., from or at the radio base station). The second example reason is that the battery backup of the radio base station is running out of power. Before the battery backup power is totally drained, the radio base station sends out its distress signal to warn of the outage.

Using this technology, an operator can save money and time. For example, if desired only a few radio base stations need to be high-availability stations (having, e.g., redundancy and battery backup, for example). Moreover, as mentioned above, the radio base stations can be divided into groups depending on their need. The groups can be delineated, not only in terms of their dependability (as previously discussed), but also in terms of the types or classes of services they typically provide. For example, a first group, such as base station group 32, includes a primary site and can ensure speech coverage over the area. A second group, such as base station group 34, includes a secondary site and can ensure high-end services over the area, such as video-telephony. Optionally, a third group, such as base station group 36, can cover a hot-spot site, which is useful to ensure a very high capacity within a specific (e.g., geographical) area.

As mentioned above, the primary sites (e.g., radio base stations of base station group 32) are equipped with battery backup, redundant hardware, etc., and preferably also serve as transmission hubs. On the other hand, the secondary sites (such as the radio base stations of base station group 34) are equipped with little or no battery backup, and are leaves on the transmission network. The secondary sites can therefore be made much cheaper than current deployed sites. The radio base stations of the base station group 36, e.g., the hot-spot sites, can be turned on (radio-wise at least) when conditions warrant, e.g., when the capacity in the secondary sites is not sufficient. In this way, an operator can save a substantial amount of power consumption.

In case of a secondary site going down, e.g., a radio base station of base station group 34, the reconfigurator 26 will tune surrounding primary sites, e.g., radio base stations in base station group 32, and secondary sites (if available) to cover the area of the downed secondary site. This is virtually the opposite procedure to a cell-split.

Figure 4A:
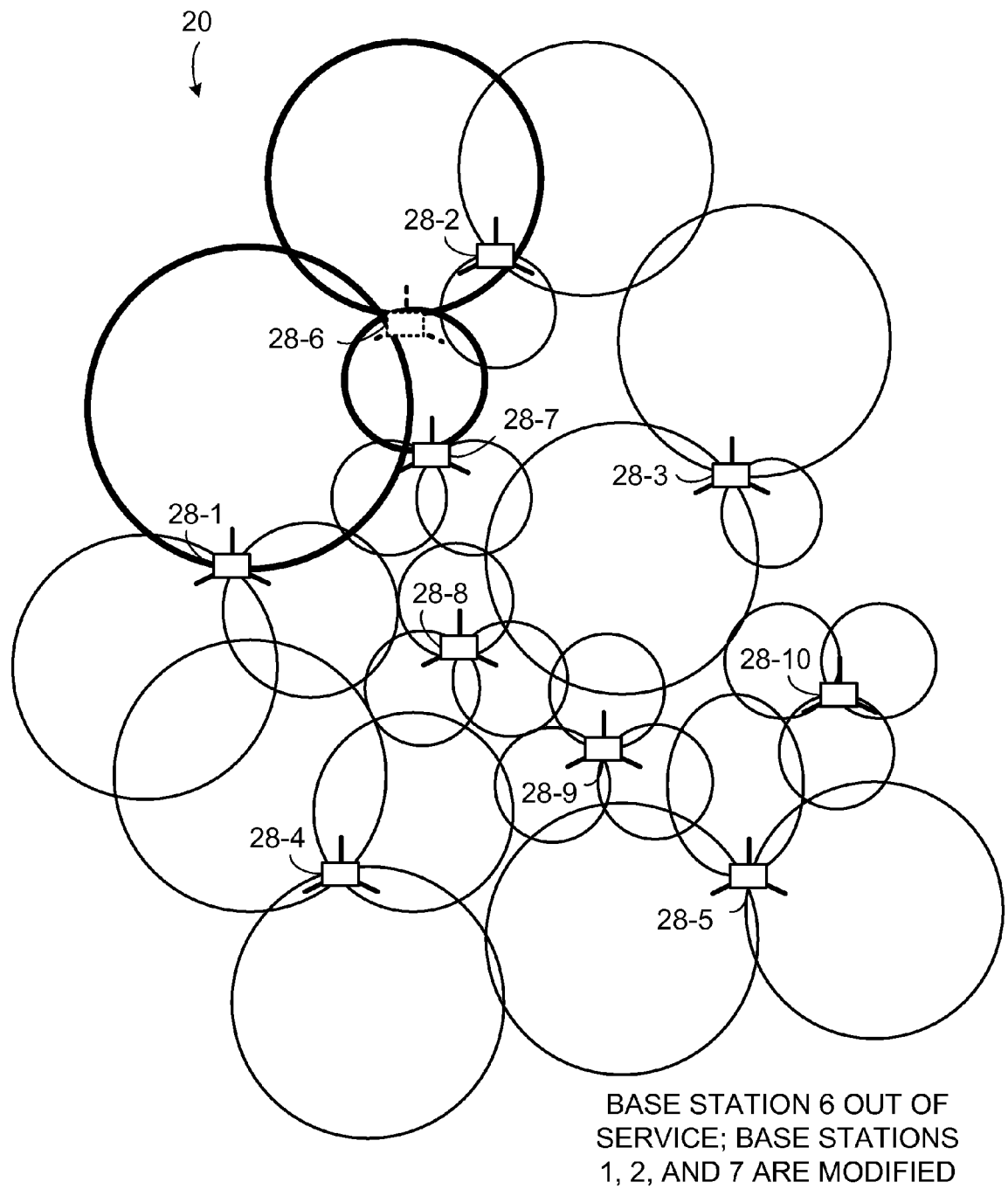
FIG. 4A is diagrammatic view of the telecommunications network of FIG. 2 illustrating implementation of the network coordinated radio base station outage compensation procedure in a first example outage scenario.
Figure 4B:
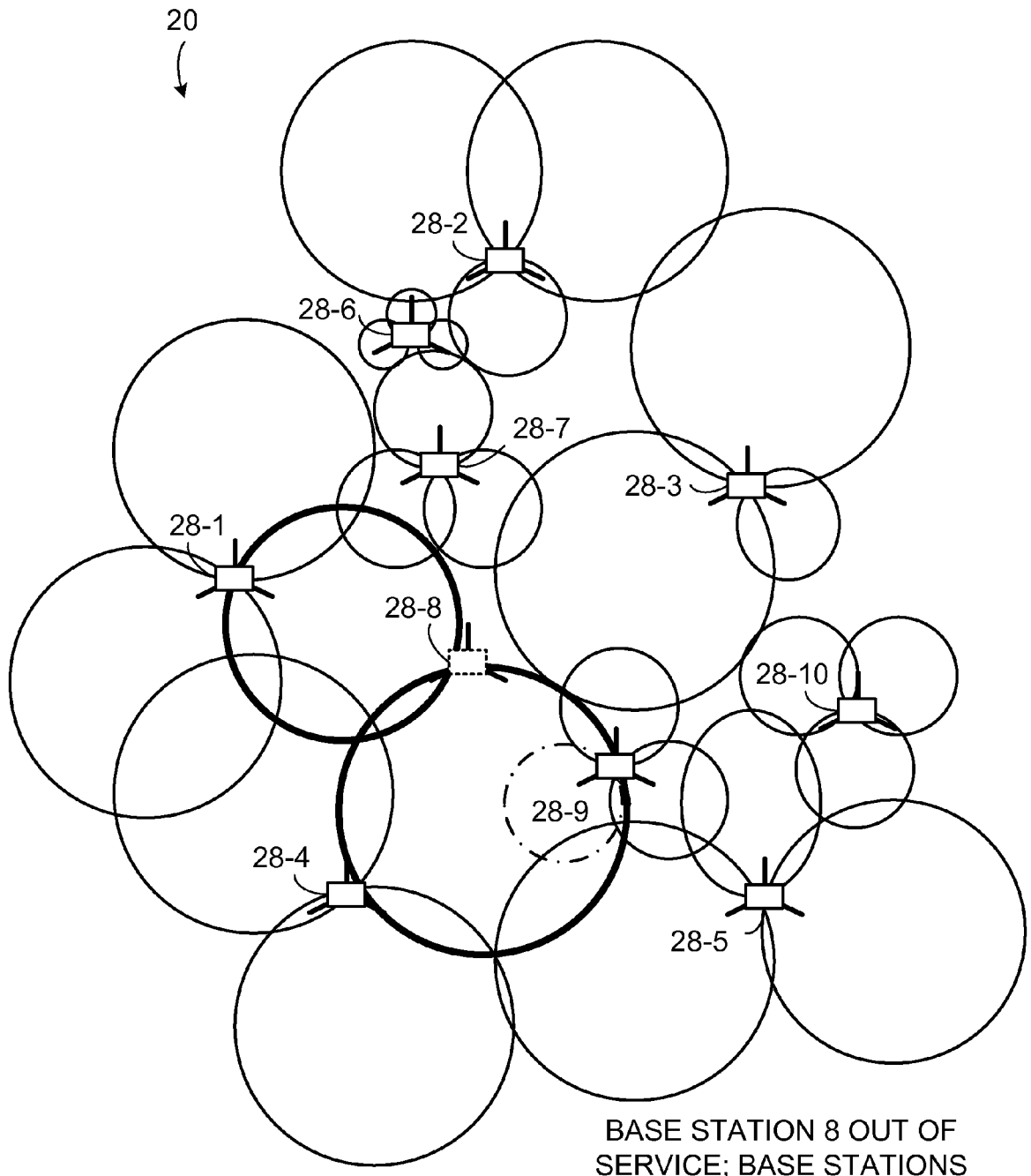
FIG. 4B is diagrammatic view of the telecommunications network of FIG. 2 illustrating implementation of the network coordinated radio base station outage compensation procedure in a second example outage scenario.

FIG. 4A, FIG. 4B, and FIG. 4C show again the telecommunications network of FIG. 2, but in conjunction with implementation of the network coordinated radio base station outage compensation procedure in each of three respective different outage scenarios.

In the first example outage scenario shown in FIG. 4A, the radio base station 28-6 serving a hot spot has been taken out of service, e.g., to save power consumption. As shown by the base station association list 44 of FIG. 1 and by darkened cell circles in FIG. 4A, characteristics of radio base station 28-1, radio base station 28-2, and radio base station 28-7 are adjusted (e.g., modified). By stating that a characteristic of a radio base station is adjusted (e.g., modified) means that the modification occurs with respect to at least one cell, and possibly only one cell, served by or emanating from the radio base station.

In the second example outage scenario shown in FIG. 4B, the radio base station 28-8 is faulty and has turned off. As shown by the base station association list 44 of FIG. 1 and by darkened cell circles in FIG. 4B, characteristics of radio base station 28-1, radio base station 28-4, and radio base station 28-9 are adjusted (e.g., modified).

Figure 4C:
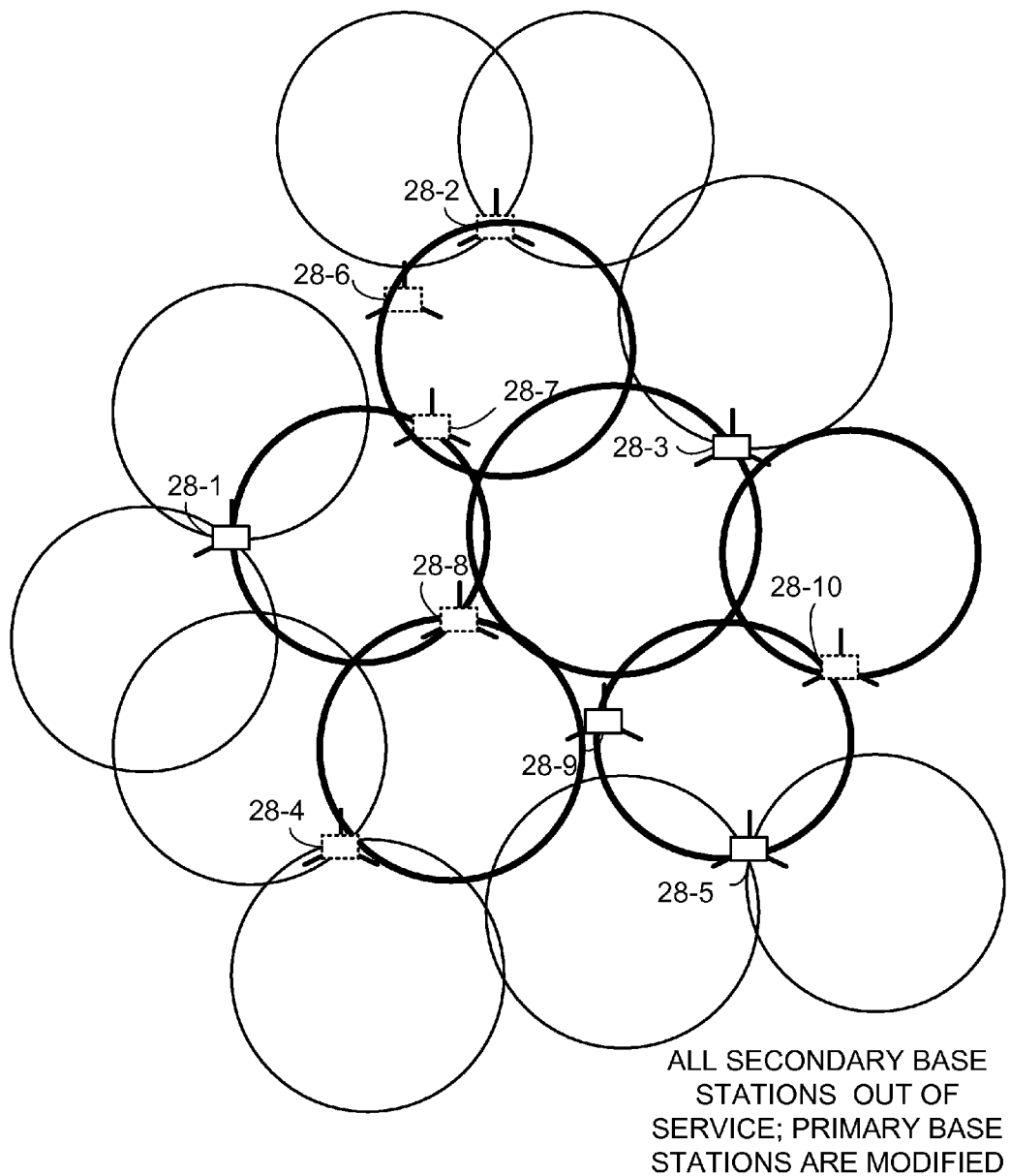
FIG. 4C is diagrammatic view of the telecommunications network of FIG. 2 illustrating implementation of the network coordinated radio base station outage compensation procedure in a third example outage scenario.

In the third example outage scenario shown in FIG. 4C, an essentially network-wide power failure has occurred and only the primary sites, e.g., the radio base stations of base station group 32, are operational because only they have battery backup. Accordingly, as shown by the darkened circles of FIG. 4C, characteristics of all primary radio base stations, e.g., radio base stations 28-1 through 28-5, are adjusted or modified.

Figure 5A:
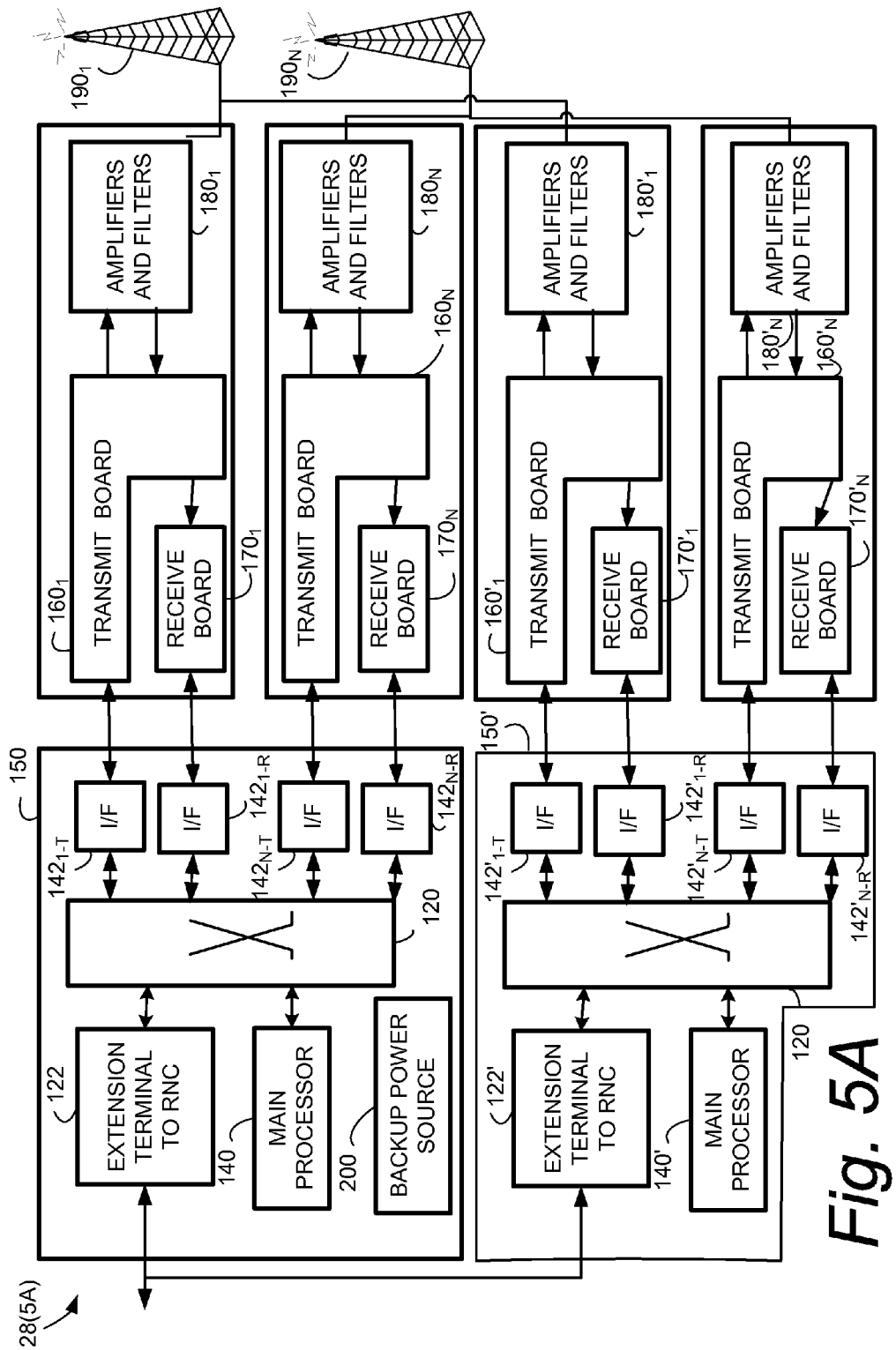
FIG. 5A is a schematic view of an example embodiment of a representative radio base station having enhanced dependability.

The technology described herein can be utilized for networks of many differing types or embodiments of radio base stations. Solely for sake of example illustration, FIG. 5A shows, in non-limiting manner, example structure of a representative radio base station 28(5A) of the type that can belong to a primary base station group, such as base station group 32, for example. In particular example of radio base station 28(5A) shown in FIG. 5A happens to be a switched-based node having a switch 120 which serves to interconnect other constituent elements of the base station 28(5A). Such other constituent elements include extension terminal 122; base station main processor 140, and interface boards 142.

Extension terminal 122 connects base station 28(5A) to a superior node of the radio access network, such as a radio network controller (RNC) node for a UTRAN network, for example. The embodiment of base station 28(5A) illustrated in FIG. 5A is housed in a rack having multiple subracks. Each subrack has one or more boards, e.g., circuit boards, mounted thereon. A first subrack 150 comprises boards for each of extension terminal 122; base station main processor 140, and interface boards 142. Each of the interface boards 142 is connected to a board on another subrack, e.g., one of the transmitter boards 160 or one of the receiver boards 170. Each receiver board 170 is connected to share certain transmitter/receiver resources in a corresponding transmitter board 160, with the transmitter board 160 being connected to a corresponding one of amplifiers and filters board 180. The amplifiers and filters board 180 is connected to an appropriate antenna 190. For example, interface board $142_{1-T}$ is connected to transmitter board $160_1$, while interface board $142_{1-R}$ is connected to receiver board $170_1$. The pair of transmitter board $160_1$ and receiver board $170_1$ is, in turn, connected to amplifiers and filters board $180_1$. Similar connections exist for a second pairing of transmitter board $160_2$ and receiver board $170_2$, which interface via interface board $142_{2-T}$ and interface board $142_{2-R}$, respectively. Each transceiver thus comprises a subrack which includes a transmitter board 160, a receiver board 170, and amplifiers and filters board 180.

The transmitter boards 160 and receiver boards 170 each include several devices. For example, each transmitter board 160 includes unillustrated elements such as an interface connected to its corresponding interface board 142; an encoder; a modulator; and, a baseband transmitter. In addition, the transmitter board 160 includes the transmitter/receiver sources which it shares with receiver board 170, including a D/G transmitter and an radio frequency transmitter. Each receiver board 170 includes unillustrated elements such as an interface connected to its corresponding interface board 142; a decoder; a demodulator; and a baseband receiver. Each amplifiers and filters board 180 includes amplifiers, such as MCPA and LNA amplifiers.

In view of the fact that the radio base station 28(5A) of FIG. 5A is a primary type base station, and thus must have assured or enhanced dependability, most of the elements described above as constituting the radio base station 28(5A) of FIG. 5A have redundant or duplicate elements, as depicted by primed reference numerals. In addition, the radio base station 28(5A) of FIG. 5A typically has a backup power supply 200, which can be realized by battery power backup, for example.

Although the redundancy of the radio base station 28(5A) of FIG. 5A is illustrated with essentially every element having a duplicate or redundant counterpart, it will be appreciated that redundancy can be provided selectively or interchangeable for particular elements or subsystems. Moreover, rather than the entire racks or subracks being provided with parallel redundancy, the parallelism of the redundancy can occur at lower levels, e.g., on a component basis.

Figure 5B:
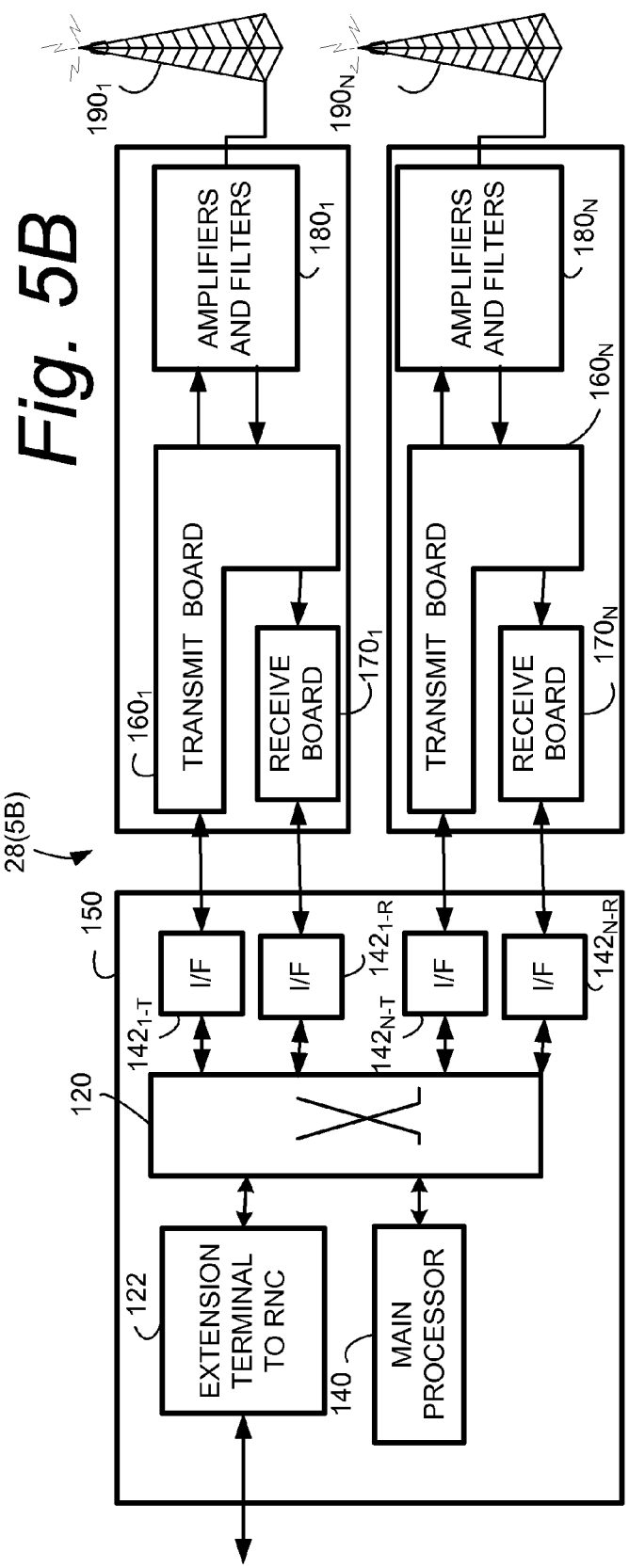
FIG. 5B is a schematic view of an example embodiment of a representative radio base station having more economy but less dependability.
Figure 1:
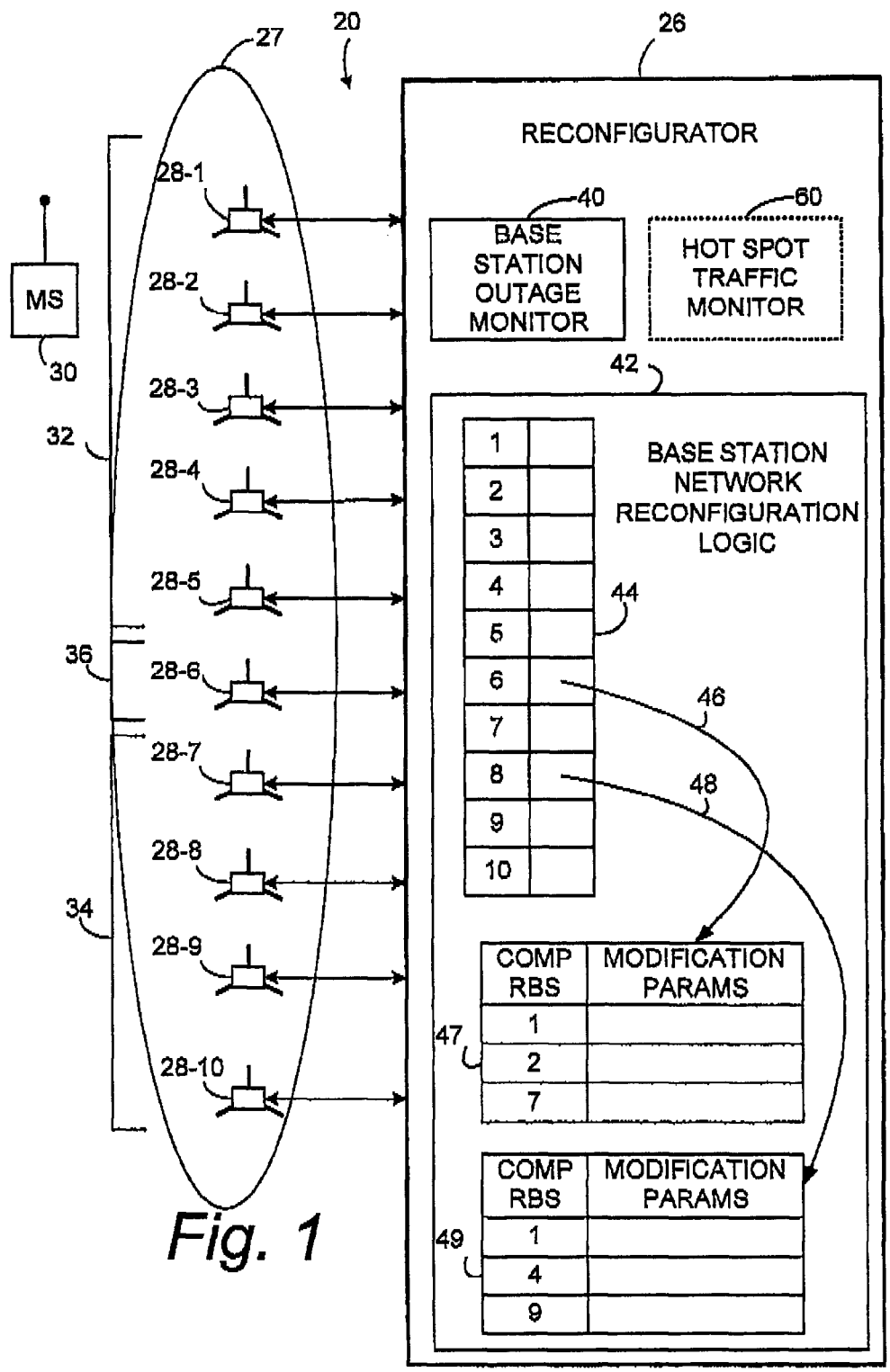

By contrast, FIG. 5B shows a radio base station 28(5B) which can function as a less dependable radio base station, such as one of the radio base stations of base station group 34, for example. As such, the radio base station 28(5B) of FIG. 5B need not have the redundancy or expensive backup power supply.

Accordingly, in view of the fact that a network such as network 27 can have some radio base stations configured as a redundant, dependable the radio base station such as radio base station 28(5A) of FIG. 5A, and that other radio base stations can be configured with less sophistication and/or redundancy in the manner such as that typified or represented by radio base station 28(5B) of FIG. 5B, homogeneity of radio base station is not required and, moreover, is preferably and beneficially eliminated.

The technology described herein involves tuning a network dynamically, with the tuning or alteration depending on what radio base stations are actually available.

The technology is applicable for any cellular standard. For an illustrated example implementation involving WCDMA, it is extra beneficial since calls from many mobile stations (e.g., user equipment units (UE)) can be maintained during such a reconfiguration due to soft handover.

The technology described herein can also be per-cell based, and not only per-RBS/site based. Further, the technology described herein makes the cost of the network as cheap as possible for the operator.

Since the network is tuned for optimum performance assuming all radio base stations are available, the antenna tilt and power of a downlink common control channel (such as a downlink common pilot channel [CPICH]) are optimized for minimum cell overlap. The tuning is done to support a certain capacity, driven by e.g. high data rate services.

As a consequence of the technology described herein, fewer urban sites (50%) require battery backup deployment. Moreover, hot-spot sites can be turned off during non-busy hour. Further, radio base stations can be taken out of service for maintenance without generating coverage gaps. Yet further, the present technology can save capital expenditures and operational expenditures Features and advantages of the present technology include, but are not limited to, (1) having multiple set of network tuning parameters and switching between them based on radio base station outage; and (2) having, per radio base station, a list of other radio base stations which can cover the area of the radio base station during an outage , with indications how to change their respective tuning parameters to do so. The outages arise for any reason, including but not limited to: (a) power mains failure; (b) a planned action, such as is required or desired for maintenance of the radio base station; or (c) cessation of operation based on reduced traffic or capacity need.

Although the description above contains many specificities, these should 15 not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

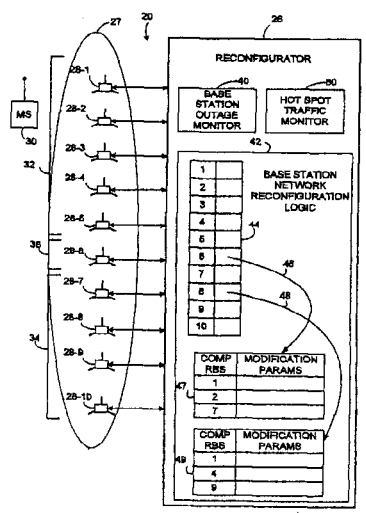

What is claimed is:

1. A reconfigurator for use with a telecommunications network, the telecommunications network comprising a network of radio base stations configured for providing radio access service to the telecommunications network for wireless stations and plural radio base stations having a modifiable characteristic, the reconfigurator being configured to associate a compensatory base station with a vulnerable base station and, in conjunction with a loss of provision of the service by the vulnerable base station, to modify the modifiable characteristic of the conmensatory base station whereby the compensatory base station is configured to at least partially compensate for the loss of the provision of the service by the vulnerable base station wherein the network of radio base stations further comprises a tertiary base station configured to provide the service in a high capacity manner within a specific geographical area, and wherein the reconfigurator is configured to turn off the tertiary base station during a low traffic condition for the specific geographical area and instead to provide the service for the specific geographical area through another radio base station.

2. The apparatus of claim 1, wherein the modifiable characteristic includes modification of antenna tilt of the compensatory base station.

3. The apparatus of claim 1, wherein the modifiable characteristic includes modification of power of downlink common control channel of the compensatory base station.

4. The apparatus of claim 1, wherein the modifiable characteristic includes modification of composition of a neighbor list of the compensatory base station.

5. The apparatus of claim 1, wherein the modifiable characteristic includes modification of a parameter pertaining to one of handover, cell power, and cell size for the compensatory base station.

6. The apparatus of claim 1, wherein the reconfigurator is configured to maintain a list of compensatory base stations having modifiable characteristics which can, in conjunction with a loss of provision of the service by the vulnerable base station, be modified to at least partially compensate for the loss of the provision of the service by the vulnerable base station.

7. The apparatus of claim 6, wherein the reconfigurator maintains the list for plural vulnerable base stations.

8. The apparatus of claim 1, wherein the network of radio base stations comprises:

a primary base station preconfigured to provide the service with a high level of dependability and to serve as the compensatory base station;

a secondary base station preconfigured to provide the service with a lower level of dependability and to serve as the vulnerable base station.

9. The apparatus of claim 8, wherein the primary base station preconfigured to provide the service with the high level of dependability by comprising at least one of power backup and hardware redundancy.

10. The apparatus of claim 1, wherein the reconfigurator is a controller.

11. A telecommunications network which comprises the network of radio base stations and the reconfigurator of claim 1.

12. A reconfigurator for use with a telecommunications network, the telecommunications network comprising a network of radio base stations configured for providing radio access service to the telecommunications network for wireless stations, the reconfigurator being configured, for differing service outages attributable to differing downed radio base stations of the network of radio base stations, to coordinately and dynamically change modifiable characteristics of plural remaining base stations for at least partially compensating for the service outages;

wherein the network of radio base stations further comprises a tertiary base station configured to provide the service in a high capacity manner within a specific geographical area, and wherein the reconfigurator is configured to turn off the tertiary base station during a low traffic condition for the specific geographical area and instead to provide the service for the specific geographical area through another radio base station.

13. The apparatus of claim 12, wherein the reconfigurator is configured, for differing service outages, to dynamically change differing modifiable characteristics of differing plural remaining base stations for at least partially compensating for the service outages.

14. The apparatus of claim 12, wherein the modifiable characteristic includes modification of antenna tilt of at least one of the plural remaining base stations.

15. The apparatus of claim, 12, wherein the modifiable characteristic includes modification of power of a downlink common control channel of at least one of the plural remaining base stations.

16. The apparatus of claim 12, wherein the modifiable characteristic includes modification of composition of a neighbor list of at least one of the plural remaining base stations.

17. The apparatus of claim 12, wherein the modifiable characteristic includes modification of a parameter pertaining to one of handover, cell power, and cell size for the at least one of the plural remaining base stations.

18. The apparatus of claim 12, wherein the reconfigurator is configured to maintain, for each of the downed radio base stations, a list of selected ones of the remaining plural radio base stations to serve as compensatory base stations having the modifiable characteristics, and for each compensatory base station to maintain an indication of the associated modifiable characteristic(s).

19. The apparatus of claim 12, wherein the network of radio base stations comprises:

plural primary base stations preconfigured to provide the service with a high level of dependability;

plural secondary base stations preconfigured to provide the service with a lower level of dependability.

20. The apparatus of claim 19, wherein the plural primary base stations are preconfigured to provide the service with the high level of dependability by comprising at least one of power backup and hardware redundancy.

21. The apparatus of claim 12, wherein the reconfigurator is a controller.

22. A telecommunications network which comprises the network of radio base stations and the reconfigurator of claim 12.

23. A method of operating a telecommunications network comprising:

providing a network of radio base stations configured for providing radio access service to the telecommunications network for wireless stations;

for differing service outages attributable to differing downed radio base stations of the network of radio base stations, coordinately and dynamically changing modifiable characteristics of plural remaining base stations for at least partially compensating for the service outages;

wherein the network of radio base stations further comprises a tertiary base station configured to provide the service in a high capacity manner within a specific geographical area, and wherein the method further comprises turning off the tertiary base station during a low traffic condition for the specific geographical area and instead providing the service for the specific geographical area through another radio base station.

24. The method of claim 23, further comprising dynamically changing differing modifiable characteristics of differing plural remaining base stations for at least partially compensating for the service outages.

25. The method of claim 23, further comprising modifying antenna tilt of at least one of the plural remaining base stations.

26. The method of claim 23, further comprising modifying power of a downlink common control channel of at least one of the plural remaining base stations.

27. The method of claim 23, further comprising modifying composition of a neighbor list of at least one of the plural remaining base stations.

28. The method of claim 23, further comprising modifying a parameter pertaining to one of handover, cell power, and cell size for the at least one of the plural remaining base stations.

29. The method of claim 23, further comprising maintaining a list of selected ones of the remaining plural radio base stations to serve as compensatory base stations having the modifiable characteristics, and for each compensatory base station maintaining an indication of the associated modifiable characteristic(s).

30. The method of claim 23, further comprising:

preconfiguring plural primary base stations to provide the service with a high level of dependability;

preconfiguring plural secondary base stations to provide the service with a lower level of dependability.

31. The method of claim 30, further comprising preconfiguring the plural primary base stations to provide the service with the high level of dependability by providing at least one of power backup and hardware redundancy for the plural primary base stations.

32. A method of operating a telecommunications network comprising:

providing a network of plural radio base stations configured for providing radio access service to the telecommunications network for wireless stations;

preconfiguring plural primary base stations of the network to comprise at least one of power backup and hardware redundancy and thereby provide a high level of dependability;

preconfiguring plural secondary base stations of the network with less dependability than the primary base stations;

operating the network with both the plural primary base stations and the plural secondary base stations during normal circumstances;

upon occurrence in the network of an abnormal circumstance interrupting the service from the plural secondary base stations, modifying at least one characteristic of the primary base stations whereby the primary base stations compensate for interruption of service for the plural secondary base stations.

33. The method of claim 32, wherein the modifiable characteristic includes at least one of modification of antenna tilt of the primary base station; modification of power of downlink common control channel of the compensatory base station; modification of composition of a neighbor list of the compensatory base station; and modification of a parameter pertaining to one of handover, cell power, and cell size for the compensatory base station.

* * * * *

UNITED STATES PATENT AND TRADEMARK OFFICE
CERTIFICATE OF CORRECTION

| | | |
|---|---|---|
| PATENT NO. | : 7,826,820 B2 | Page 1 of 3 |
| APPLICATION NO. | : 11/677962 | |
| DATED | : November 2, 2010 | |
| INVENTOR(S) | : Björk et al. | |

It is certified that error appears in the above-identified patent and that said Letters Patent is hereby corrected as shown below:

The title page showing the illustrative figure should be deleted to be replaced with the attached title page.

The drawing sheet, consisting of Fig. 1, should be deleted to be replaced with the drawing sheet, consisting of Fig. 1, as shown on the attached page.

In the drawings:

Fig. 4B, Sheet 5 of 8, delete " 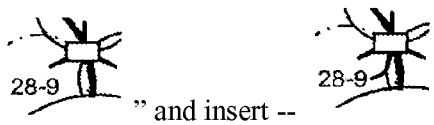 " and insert -- 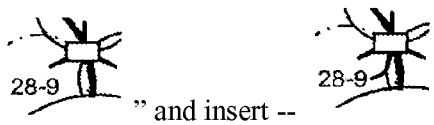 --, therefor.

In Column 13, Line 62, before "not" delete "15".

In Column 14, Line 32, in Claim 1, delete "conmensatory" and insert -- compensatory --, therefor.

In Column 14, Line 35, in Claim 1, delete "station" and insert -- station; --, therefor.

Signed and Sealed this
Thirty-first Day of May, 2011

David J. Kappos
*Director of the United States Patent and Trademark Office*

(12) United States Patent
Björk et al.

(10) Patent No.: US 7,826,820 B2
(45) Date of Patent: Nov. 2, 2010

(54) NON-HOMOGENOUS TELECOMMUNICATIONS BASE STATIONS

(75) Inventors: Peter Björk, Askim (SE); Helene Hallberg, Södertälje (SE); Jacob Osterling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 835 days.

(21) Appl. No.: 11/677,962

(22) Filed: Feb. 22, 2007

(65) Prior Publication Data

US 2008/0064361 A1    Mar. 13, 2008

Related U.S. Application Data

(60) Provisional application No. 60/824,936, filed on Sep. 8, 2006.

(51) Int. Cl.
    *H04M 11/00* (2006.01)
(52) U.S. Cl. .................................... 455/403; 455/561
(58) Field of Classification Search .............. 455/403, 455/423, 433, 436, 437, 561; 370/26, 336, 370/338, 329, 346
    See application file for complete search history.

(56) References Cited

U.S. PATENT DOCUMENTS

| | | | |
|---|---|---|---|
| 5,434,798 | A | 7/1995 | Madebrink et al. |
| 5,852,778 | A | 12/1998 | Labedz |
| 6,845,238 | B1 | 1/2005 | Muller |
| 2002/0004406 | A1 | 1/2002 | Namura et al. |
| 2005/0123301 | A1 | 6/2005 | Kallstenius |
| 2006/0084441 | A1 | 4/2006 | Dowling |
| 2007/0190996 | A1* | 8/2007 | Asthana et al. ............ 455/420 |

FOREIGN PATENT DOCUMENTS

| | | |
|---|---|---|
| GB | 2 328 581 A | 2/1999 |
| GB | 2 361 385 A | 10/2001 |

OTHER PUBLICATIONS

U.S. Appl. No. 11/538,077 filed Oct. 3, 2006, entitled Automatic Building of Neighbor Lists in Mobile System.
International Search Report and Written Opinion mailed Feb. 26, 2008 in corresponding PCT application PCT/SE2007/050321.

* cited by examiner

*Primary Examiner*—Sam Bhattacharya
(74) *Attorney, Agent, or Firm*—Nixon & Vanderhye, P.C.

(57) ABSTRACT

A network reconfigurator (26) is provided for use in a telecommunications network (20) comprising a network (24) of radio base stations configured for providing radio access service to the telecommunications network for wireless stations (30). The network reconfigurator is arranged or configured, for differing service outages attributable to differing downed radio base stations (28) of the network of radio base stations, to coordinately and dynamically change modifiable characteristics of plural remaining base stations for at least partially compensating for the service outages. Preferably the reconfigurator (26) is configured, for differing service outages, to dynamically change differing modifiable characteristics of differing plural remaining base stations for at least partially compensating for the service outages. Modifying a characteristic of the plural remaining base stations can include modification of one or more of the following: antenna tilt of at least one of the plural remaining base station; power of a downlink common control channel of at least one of the plural remaining base stations; composition of a neighbor list of at least one of the plural remaining base stations; a parameter pertaining to one of handover, cell power, and cell size for the at least one of the plural remaining base stations.

33 Claims, 8 Drawing Sheets